May 19, 1936.  A. SUPPLIE  2,041,444
FASTENING DEVICE
Filed March 14, 1933
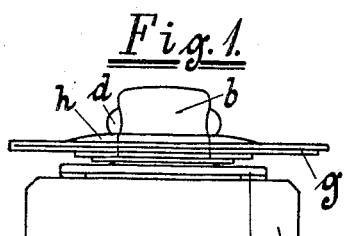
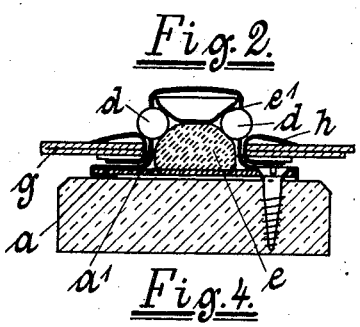
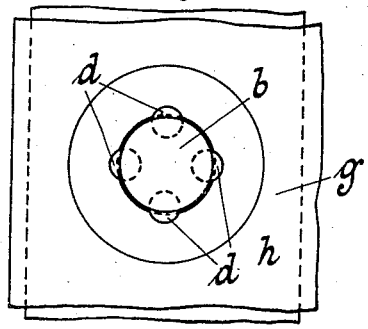
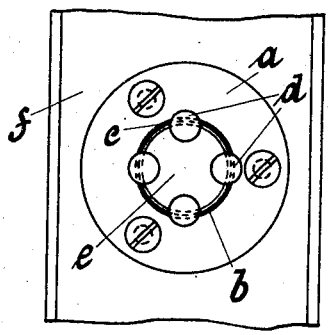
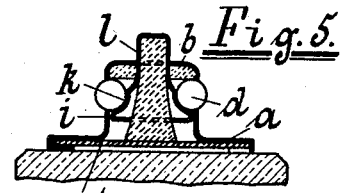
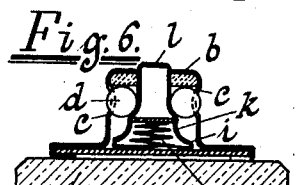
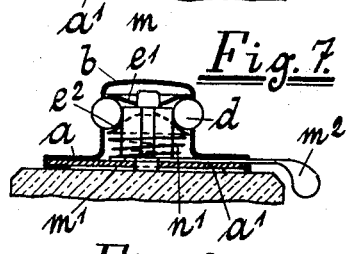
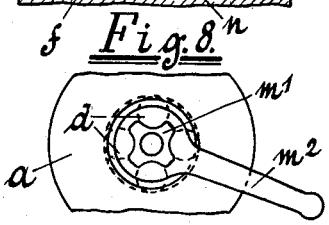
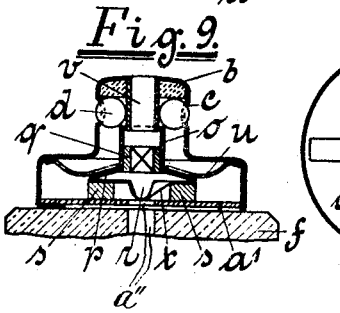
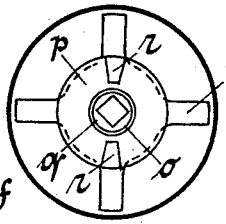
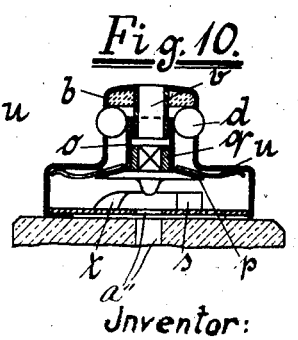
Inventor:
Adolf Supplie Patented May 19, 1936

2,041,444

UNITED STATES PATENT OFFICE 2,041,444

FASTENING DEVICE

Adolf Supplie, Wetter-on-the-Ruhr, Germany

Application March 14, 1933, Serial No. 660,686
In Germany March 19, 1932

3 Claims. (Cl. 24—211)

This invention relates to a device for fastening canvas and other fabric tops to the frames of motor cars and other vehicles, and for joining together parts of tents and other covers.

The fastening means hithero in use in this respect comprise key bolts, eyes and chains, and press buttons, but the two first-mentioned means are bothersome to attach and produce troublesome noises and press buttons fail to establish an absolutely safe and reliable connection.

The drawbacks connected with the known fastening means of this class are eliminated by the invention, several embodiments of which are illustrated in the accompanying drawing, in which Figure 1 is an elevation of the device according to the invention; Fig. 2, a longitudinal section thereof; Fig. 3, a top view thereof; Fig. 4, a cross section thereof; Figs. 5 and 6 are longitudinal sections of a second constructional form; Figs. 7 and 8 are, respectively, a cross section and a view of a third embodiment; and Figs. 9 and 10 are longitudinal sections and Fig. 11 is a view of a fourth embodiment.

Referring to the drawing and first to Figs. 1 to 4, the device according to the invention consists of a hollow body $b$ provided with a fastening disc $a$ and a closing disc $a^1$, and the side wall of the body $b$ possesses a plurality of holes $c$ of which four are shown in the drawing. In the holes $c$ balls $d$ are placed and pressed into the holes and held in position therein by means of a buffer member $e$ made of rubber or other resilient material and by an elastic disc $e^1$ (Fig. 2) arranged in the top of the body $b$, the holes $c$ being of a size permitting the balls $d$ to project from the body $b$ without dropping out therefrom.

Instead of the buffer $e$ a spring may be employed and instead of four balls $d$ a larger or smaller number may be used, according to the size of the hollow body $b$ and the purpose it serves.

According to Figs. 5 and 6, the hollow body $b$ contains an inserted sleeve $i$ possessing a lateral contraction $k$ hugging the balls $d$ and a connecting neck $l$ which is narrower than the contraction $k$ to the extent as the balls $d$ project from the hollow body $b$ and which passes through a hole of the latter so as to slightly project therefrom. The sleeve $i$ contains either an elastic buffer member $m$, as shown in Fig. 5, or a conical spring $n$ according to Fig. 6 for holding the sleeve $i$ in the position shown in Fig. 5 in which the balls $d$ are held while projecting from the body $b$. To protect the sleeve $i$ against being moved out of the locking position shown in Fig. 5 by a pressure applied to the balls $d$, the contraction $k$ extends to slightly above the center of the balls $d$ and the neck $l$ begins therefore also at a point beyond the center of the balls.

As indicated in the drawing, the hollow bodies $b$ are either secured to a frame $f$ at a certain distance from one another in case vehicle tops or the like are concerned, or they are attached directly to the tent parts or other covering matters.

$g$ represents a canvas or other suitable fabric part provided with spaced holes bound with the discs $h$ which fit over the hollow bodies $b$.

When the discs $h$ are slipped over the bodies $b$ and pressed under the balls $d$, the discs will be held in position by the balls as will be the fabrics concerned, such as motor car tops, tent parts and the like, which can be taken off or separated by drawing the discs $h$ again over the hollow bodies $b$ in the other direction.

In the construction shown in Figs. 5 and 6, the balls $d$ are locked also by the sleeve $i$ which has first to be pressed down into the position shown in Fig. 6 before the disc $h$ can be attached and the balls $d$ can enter the hollow body $b$ to such an extent as not to project therefrom. After attachment of the disc $h$ the sleeve $i$ is released and, owing to the pressure of the buffer member $m$ or the spring $n$, returns into the position according to Fig. 5, whereupon the balls $d$ are locked firmly.

Locking of the balls $d$ is effected also in the construction shown in Figs. 7 and 8, in which the balls are disposed between two bent resilient steel discs $e^1$ and $e^2$, to the lower one of which pressure is applied by the spring $n^1$. Between the balls $d$ an angular grooved pin $m^1$ is arranged which passes through the disc $e^2$ and which can be turned by a lever $m^2$ leading outside between the discs $a$ and $a^1$. In the position shown the pin $m^1$ locks the balls $d$; by giving the pin a turn of 90° the balls may be pressed from without into the grooves of the pin. The lever $m^2$ is prevented from rotation in both end positions by means of projections, shoulders or the like.

Figs. 9 to 11 show a device provided with a closure for the balls $d$, which is to be actuated by a key. The hollow body $b$ contains in this case a sleeve $o$ fitted with a disc $p$ and a bush $q$ having an angular hollow for the reception of an angular key, and the disc $p$ possesses two oppositely disposed projections $r$ which are rounded off below. The disc $a^1$ of the hollow body $b$ is fitted with an annular edge $s$ having two opposite clearances $t$ sloping on one side, which are engaged by the projections $r$, as indicated in Fig. 9. A spring $u$ having the shape of a cross or some other shape, holds the sleeve $o$ in position. In the hollow body $b$ a sleeve $v$ is provided which slightly engages the sleeve $o$ and through which a key may be inserted. Insertion of a key is further possible from below through a hole $a''$ of the disc $a^1$ and the ledge $f$.

If the sleeve $o$ is turned 90° from the position shown in Fig. 9 into the one shown in Fig. 10, the balls $d$ are pressed out by the sleeve $o$ and held in position thereby, so that they cannot be pressed in, as the sleeve $o$ is held in position by the projections $r$ resting on the edge $s$ and held by a small notch in the latter. The hollow body $b$ in this construction compared with the one illustrated in Figs. 1 to 6 is boxlike enlarged and extended.

For connecting tent portions or the like the hollow bodies $b$ are made so short that the disc $h$ with the tent portion or the like will fit into the space between the balls $d$ and the disc $a$ without any play and therefore cannot be moved to and fro by wind pressure. The hollow bodies may of course be made so long as to attach two, three or more tent portions or the like, but this should also be done without allowing any play.

I claim:—

1. A device for fastening fabric tops to frames and joining tent parts and the like together, comprising a hollow body having an apertured side wall, a plurality of balls arranged in the apertures of said body, a plurality of discs for bordering spaced holes in the parts to be joined, said balls being adapted to cooperate with said discs to hold them in locked position, an elastic disc in the top of the hollow body, a sleeve in the hollow body, said sleeve having a contracted portion and a projecting neck, and a pressure member actuating said sleeve for pressing the balls into locking position and holding them therein.

2. A device according to claim 1, wherein the pressure member is a rubber buffer.

3. A device according to claim 1, wherein the pressure member is a conical spring.

ADOLF SUPPLIE.